US012578978B1

(12) United States Patent
Gandhi et al.

(10) Patent No.: US 12,578,978 B1
(45) Date of Patent: Mar. 17, 2026

(54) AUTOMATIC ONE CLICK VIRTUAL BUTTON FOR AI ASSIST FOR GRAPHIC DESIGNS

(71) Applicants: Vineet Gandhi, Hyderabad (IN); Srinivasa Raghavan Rajendran, Chennai (IN); Aasheesh Singh, Bahadurgarh (IN); Arjun Khanna, Chennai (IN)

(72) Inventors: Vineet Gandhi, Hyderabad (IN); Srinivasa Raghavan Rajendran, Chennai (IN); Aasheesh Singh, Bahadurgarh (IN); Arjun Khanna, Chennai (IN)

( * ) Notice: Subject to any disclaimer, the term of this patent is extended or adjusted under 35 U.S.C. 154(b) by 0 days.

(21) Appl. No.: 17/539,195

(22) Filed: Dec. 1, 2021

(51) Int. Cl.
*G06F 9/451* (2018.01)

(52) U.S. Cl.
CPC .................................... *G06F 9/453* (2018.02)

(58) Field of Classification Search
CPC ....................................................... G06F 9/453
See application file for complete search history.

(56) References Cited

U.S. PATENT DOCUMENTS

| | | | | | |
|---|---|---|---|---|---|
| 2005/0080764 | A1* | 4/2005 | Ito | ........................ | H04N 21/4316 |
| 2010/0275263 | A1* | 10/2010 | Bennett | ................. | G06F 21/577 |
| | | | | | 345/589 |
| 2015/0186156 | A1* | 7/2015 | Brown | .................... | H04L 51/02 |
| | | | | | 715/706 |
| 2017/0329490 | A1* | 11/2017 | Esinovskaya | ....... | G06F 3/04817 |
| 2019/0251723 | A1* | 8/2019 | Coppersmith, III | ... | G06N 3/045 |
| 2020/0019418 | A1* | 1/2020 | P K | ....................... | G06K 9/6267 |
| 2020/0060007 | A1* | 2/2020 | Harrison | ................ | G06N 20/00 |
| 2020/0104353 | A1* | 4/2020 | Chua | .................... | G06N 20/00 |
| 2020/0380060 | A1* | 12/2020 | Siani Cohen | ........ | G06N 3/0445 |

(Continued)

*Primary Examiner* — Tadesse Hailu

(57) ABSTRACT

In one aspect, a computerized method of automatically generating suggestions for a graphic design using a one click virtual button using an artificial-intelligence (AI) assistant for generating one or more contextually relevant graphics designs includes the step of receiving a digital design in a digital design tool. The digital design tool comprises the one click virtual button using the AI assistant for generating the one or more contextually relevant graphic designs. The method includes the step of detecting an event trigger for the one click virtual button. The method includes the step of with the AI assistant. The AI assistants operations includes determining and suggesting a set of alternate background images for the digital design, determining and suggesting a set of alternate font types, determining and suggesting a set of color replacements, determining and suggesting a set of alternate layout suggestions of multiple elements in the scene, determining and suggesting a set of icon replacements, determining and suggesting a set of graphs and chart replacements, determining and suggesting a set of resizes of the digital design, and determining and suggesting a set of alternate collage configuration. The method includes the step of enabling a user to selection at least of the as a user selection. The method includes the step of integrating the user selection into an updated version of the digital design. The method includes the step of displaying the updated version of the digital design in the digital design tool.

4 Claims, 12 Drawing Sheets

(56)            References Cited

U.S. PATENT DOCUMENTS

| | | | |
|---|---|---|---|
| 2021/0042135 A1* | 2/2021 | Gandhi | G06T 13/40 |
| 2021/0241865 A1* | 8/2021 | Bhattacharya | G06Q 30/0205 |
| 2021/0350620 A1* | 11/2021 | Bronstein | G06N 20/00 |
| 2022/0027753 A1* | 1/2022 | Srivastava | G06Q 10/10 |
| 2022/0075845 A1* | 3/2022 | Bowen | G06F 21/10 |
| 2022/0138402 A1* | 5/2022 | Kraus | G06F 40/109 |
| | | | 715/269 |
| 2022/0215606 A1* | 7/2022 | Radford | G06F 40/109 |
| 2022/0215630 A1* | 7/2022 | Solanki | G10L 15/22 |

* cited by examiner

Figure 1:
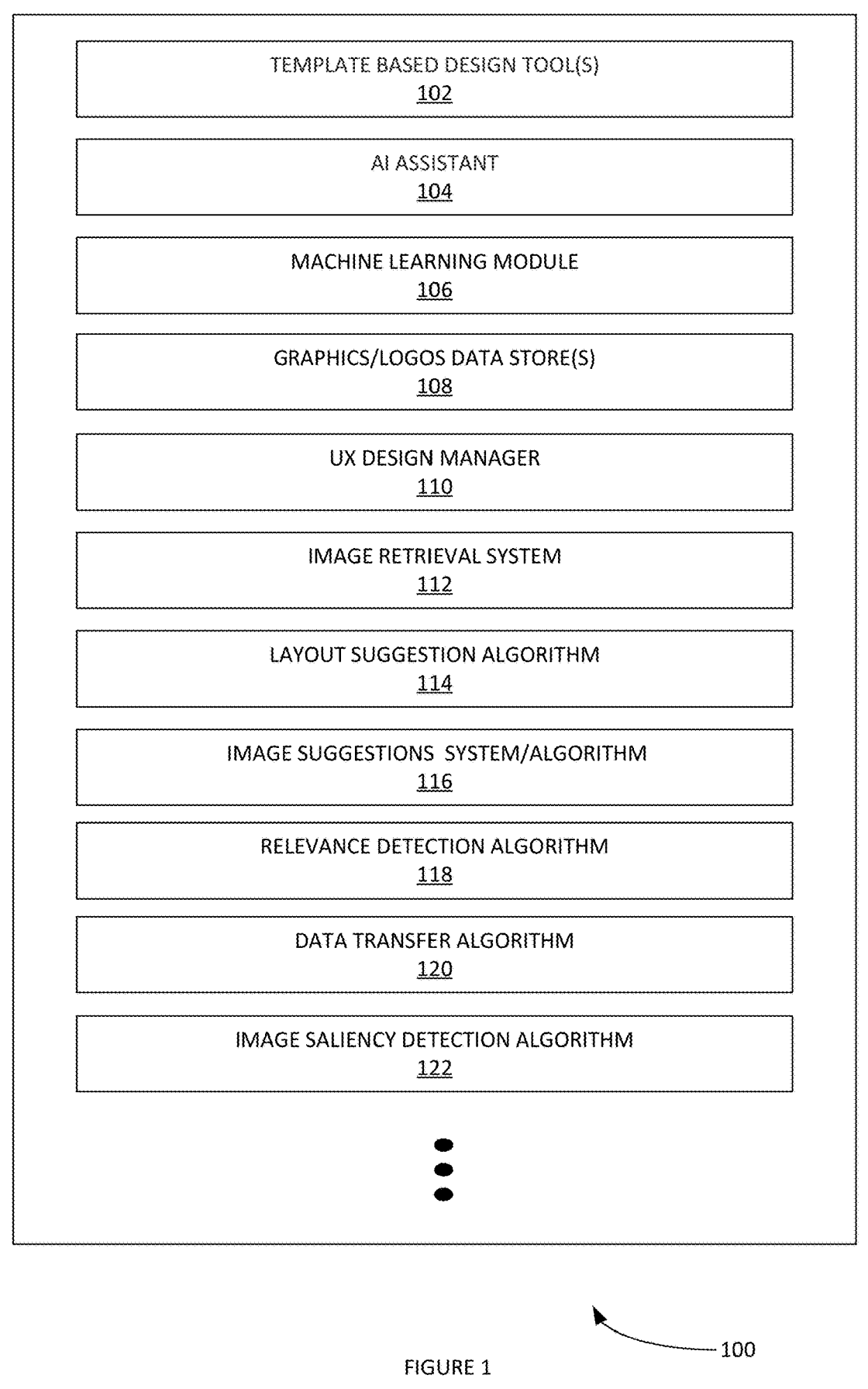

TEMPLATE BASED DESIGN TOOL(S)
102

AI ASSISTANT
104

MACHINE LEARNING MODULE
106

GRAPHICS/LOGOS DATA STORE(S)
108

UX DESIGN MANAGER
110

IMAGE RETRIEVAL SYSTEM
112

LAYOUT SUGGESTION ALGORITHM
114

IMAGE SUGGESTIONS SYSTEM/ALGORITHM
116

RELEVANCE DETECTION ALGORITHM
118

DATA TRANSFER ALGORITHM
120

IMAGE SALIENCY DETECTION ALGORITHM
122

SUGGEST ALTERNATE BACKGROUND IMAGES
202

SUGGEST ALTERNATE FONT TYPE
204

SUGGEST COLOR REPLACEMENTS
206

SUGGEST ALTERNATE LAYOUT SUGGESTIONS OF MULTIPLE ELEMENTS IN SCENE
208

SUGGEST ICON REPLACEMENTS
210

SUGGEST GRAPHS AND CHART REPLACEMENTS
212

SUPPORT INTELLIGENT RESIZE
214

SUGGEST ALTERNATE COLLAGE CONFIGURATION
216

200

400

500

600

700

800

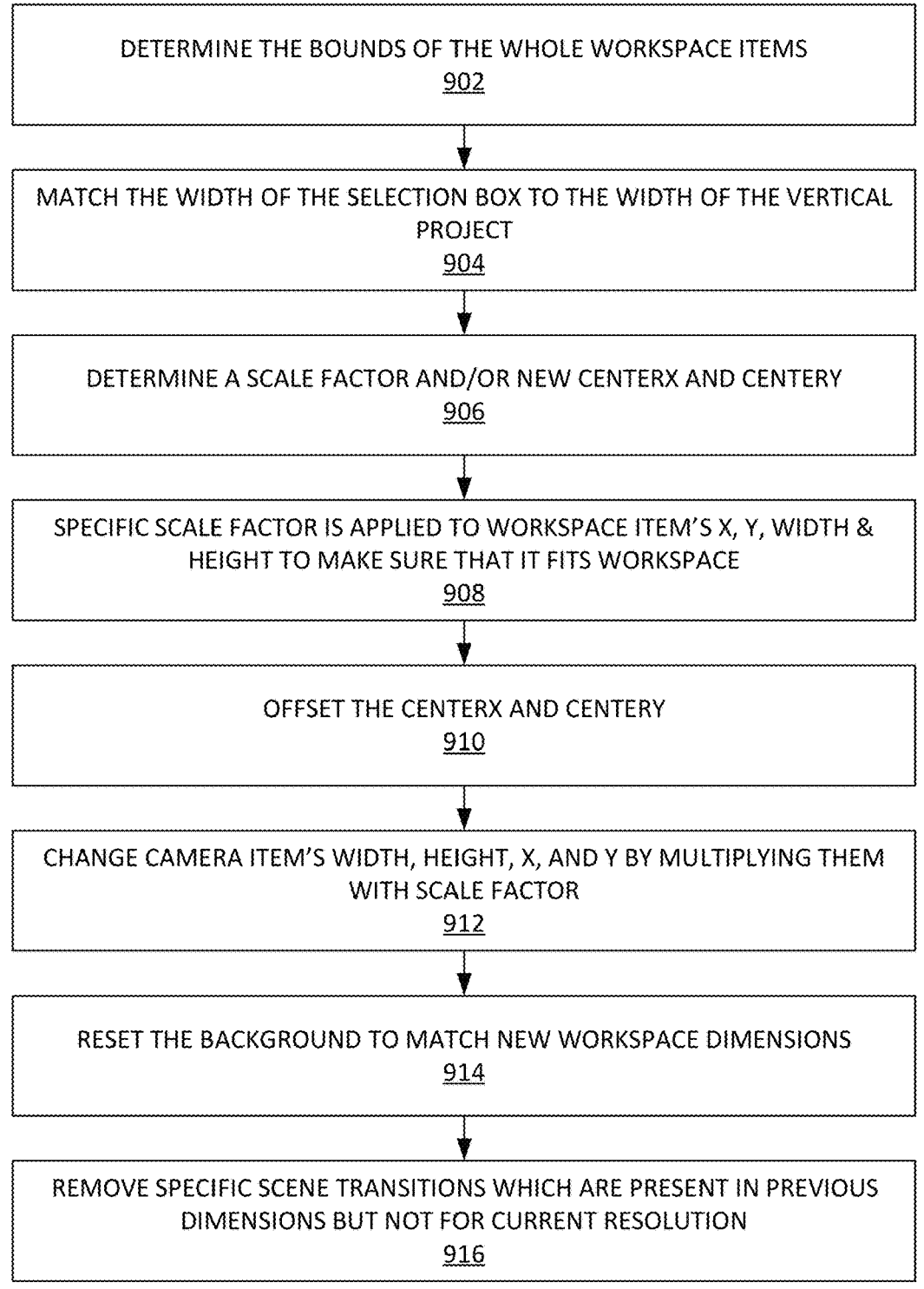

DETERMINE THE BOUNDS OF THE WHOLE WORKSPACE ITEMS
902

MATCH THE WIDTH OF THE SELECTION BOX TO THE WIDTH OF THE VERTICAL PROJECT
904

DETERMINE A SCALE FACTOR AND/OR NEW CENTERX AND CENTERY
906

SPECIFIC SCALE FACTOR IS APPLIED TO WORKSPACE ITEM'S X, Y, WIDTH & HEIGHT TO MAKE SURE THAT IT FITS WORKSPACE
908

OFFSET THE CENTERX AND CENTERY
910

CHANGE CAMERA ITEM'S WIDTH, HEIGHT, X, AND Y BY MULTIPLYING THEM WITH SCALE FACTOR
912

RESET THE BACKGROUND TO MATCH NEW WORKSPACE DIMENSIONS
914

REMOVE SPECIFIC SCENE TRANSITIONS WHICH ARE PRESENT IN PREVIOUS DIMENSIONS BUT NOT FOR CURRENT RESOLUTION
916

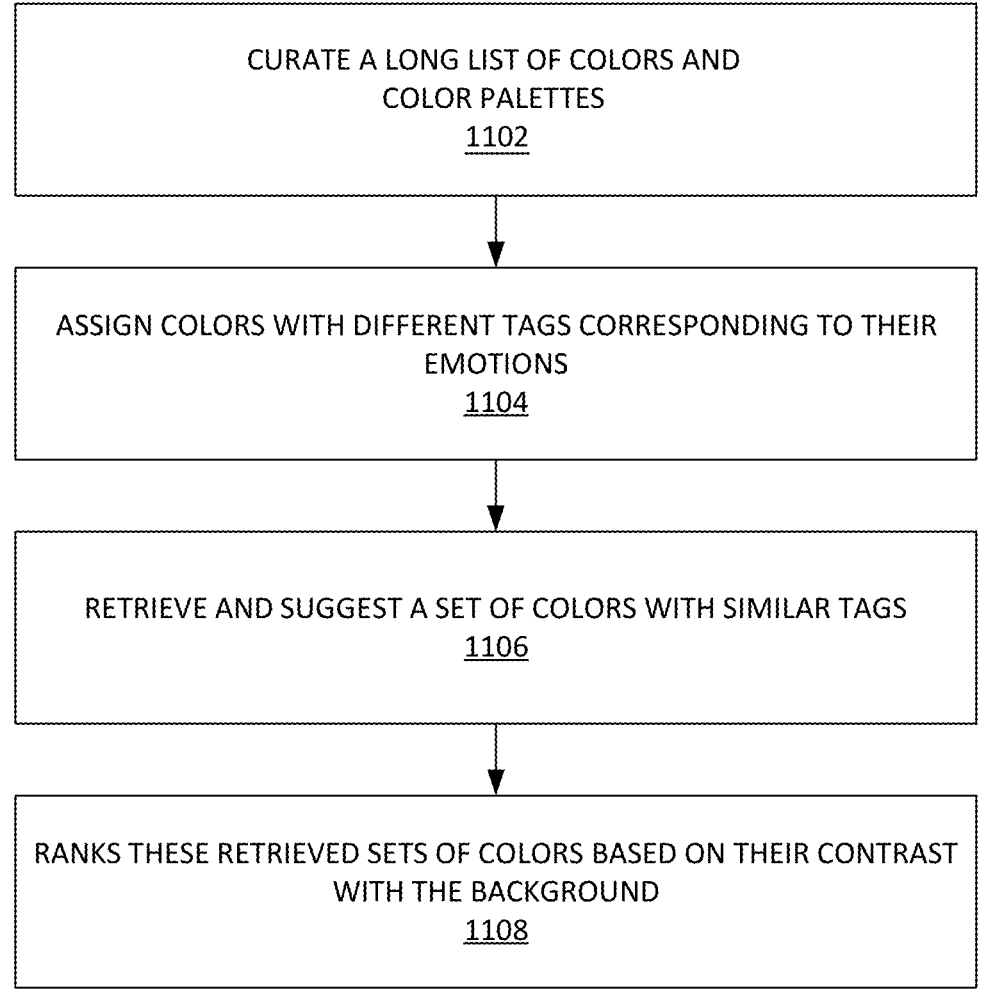
CURATE A LONG LIST OF COLORS AND
COLOR PALETTES
1102
ASSIGN COLORS WITH DIFFERENT TAGS CORRESPONDING TO THEIR
EMOTIONS
1104
RETRIEVE AND SUGGEST A SET OF COLORS WITH SIMILAR TAGS
1106
RANKS THESE RETRIEVED SETS OF COLORS BASED ON THEIR CONTRAST
WITH THE BACKGROUND
1108
1100
FIGURE 11

AUTOMATIC ONE CLICK VIRTUAL BUTTON FOR AI ASSIST FOR GRAPHIC DESIGNS

BACKGROUND

Field of the Invention

The invention is in the field of computer animation and more specifically to a method, system, and apparatus for an automatic one click virtual button for AI assist for graphic designs.

Description of the Related Art

Nonprofessional designers can often tell a poor design from a good design. It is a general rule that people are better at choosing than creation. But with a large number of possible edits, involving multiple elements a nonprofessional designer can end up in an infinite loop of changes. Editing and tracking of visual changes at both granular level and macro level is also difficult. Accordingly, there is a need to improve the automation of the graphics-design creation in an automatic process.

BRIEF SUMMARY OF THE INVENTION

In one aspect, a computerized method of automatically generating suggestions for a graphic design using a one click virtual button using an artificial-intelligence (AI) assistant for generating one or more contextually relevant graphic designs includes the step of receiving a digital design in a digital design tool. The digital design tool comprises the one click virtual button using the AI assistant for generating the one or more contextually relevant graphic designs. The method includes the step of detecting an event trigger for the one click virtual button. The method includes the step of with the AI assistant. The AI assistants operations includes determining and suggesting a set of alternate background images for the digital design, determining and suggesting a set of alternate font types, determining and suggesting a set of color replacements, determining and suggesting a set of alternate layout suggestions of multiple elements in the scene, determining and suggesting a set of icon replacements, determining and suggesting a set of graphs and chart replacements, determining and suggesting a set of resizes of the digital design, and determining and suggesting a set of alternate collage configuration. The method includes the step of enabling a user to selection at least of the as a user selection. The method includes the step of integrating the user selection into an updated version of the digital design. The method includes the step of displaying the updated version of the digital design in the digital design tool.

BRIEF DESCRIPTION OF THE DRAWINGS

FIG. 1 illustrates an example system for automatic one click virtual button with AI assist for graphic designs, according to some

FIG. 9 provides a process for implementing an intelligent resize, according to some embodiments.

FIG. 11 illustrates an example process for utilizing an AI assistant to suggest color replacements in a graphic design, according to some embodiments.

Figure 2:
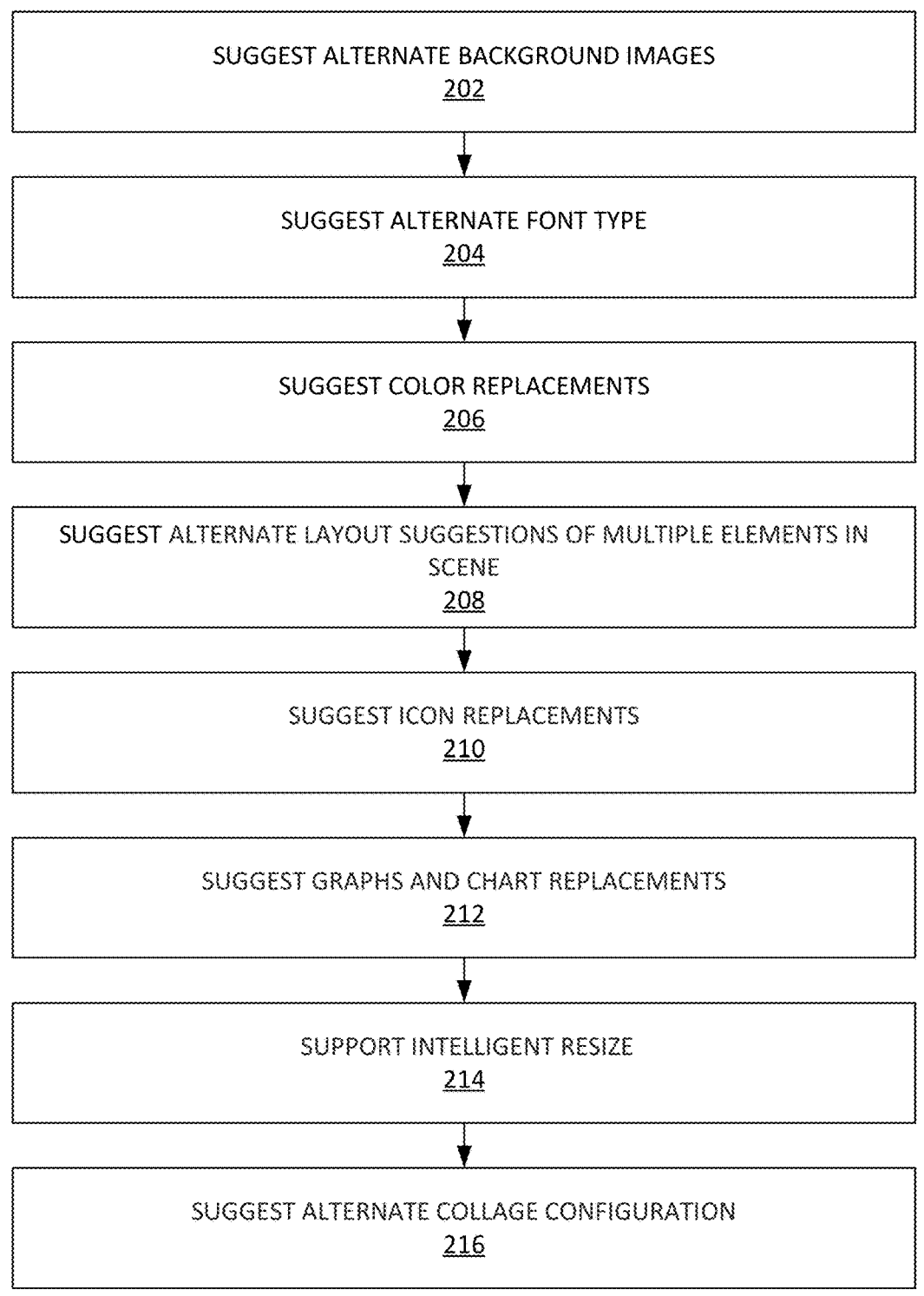
FIG. 2 illustrates an example process of an AI assistant, according to some embodiments.

The Figures described above are a representative set and are not an exhaustive with respect to embodying the invention.

DESCRIPTION

Disclosed are a system, method, and article of manufacture for automatic one click virtual button with AI assist for graphic designs. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Bidirectional Encoder Representations from Transformers (BERT) is a transformer-based machine learning technique for natural language processing (NLP) pre-training.

Extensible Markup Language (XML) is a markup language that defines a set of rules for encoding documents in a format that is both human-readable and machine-readable.

JavaScript Object Notation (JSON) is an open-standard file format that uses human-readable text to transmit data objects consisting of attribute—value pairs and array data types (or any other serializable value).

Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Supervised learning is the machine learning task of learning a function that maps an input to an output based on example input-output pairs. Supervised learning infers a function from labeled training data consisting of a set of training examples. In supervised learning, each example is a pair consisting of an input object (e.g. a vector) and a desired output value/supervisory signal). A supervised learning algorithm analyzes the training data and produces an inferred function, which can be used for mapping new examples. An optimal scenario can allow for the algorithm to correctly determine the class labels for unseen instances. Supervised learning can use a learning algorithm to generalize from the training data to unseen situations using an inductive bias.

Example Systems and Methods

FIG. 1 illustrates an example system 100 for automatic one click virtual button with AI assist for graphic designs, according to some embodiments. System 100 can be used to change the graphic designs with the use of a single click of a button. As used herein, the graphic design can include, inter alia: logos, photo collages, memes, social media posts, earnings reports, greeting cards, invitation cards, newsletters, business proposals, t-shirts, certificates, posters, presentations etc.

System 100 can include additional system not shown. These can include, inter alia: graphic editors, data base managers, data base(s), search engines, NLP systems, optical character recognitions, chat bots, ranking systems/algorithms, etc.

System 100 can include template-based design tool 102. Template-based design tools 102 allow users to pick and quickly edit an existing design curated by a professional artist. The biggest challenge faced by the current template-based design creation tools is that the same template is used multiple times with minimal edit leads to design overload or design overuse. In order to change or create a unique design from scratch or change everything in the template, users can possess a good knowledge of multiple items like, inter alia: font, color, layout, image selection, etc.

System 100 can include AI assistant 104. AI assistant 104 can suggest possible variations of the design to the user on a single click of a button. AI assistant 104 can understand the context of the current visuals and suggest multiple levels of improvement in the form of, inter alia: color, type, size, shape, etc. AI assistant 104 can analyze the graphics and automatically suggest sequential changes, concurrent changes and/or in any specific order. AI assistant 104 can initiate its functionalities and operations when a virtual button is 'pressed' by a user.

FIG. 2 illustrates an example process 200 of an AI assistant 104, according to some embodiments.

In step 202, process 200 can cause AI assistant 104 to suggest alternate background images. Process 200 can automatically suggest alternate images for a given design. Process 200 can select the alternate suggestions from a data store of digital images (e.g. a large resource of over one hundred million images, etc.). Process 200 can utilize an image suggestions system/algorithm 116. The image suggestion system can quickly generate digital image suggestions (e.g. within 1/10th of a second, etc.). Image suggestions system/algorithm 116 can include image search systems, image matching and recommendation systems, etc. Process 200 uses the image suggestion system to combine a keyword matching and sentence embedding based approach.

Process 200 can process the textual content on the graphic to locate important keywords. Each keyword is ranked based on a ranking algorithm, which takes multiple aspects like size of the word, bold/not bold, Part of Speech (POS) tags etc. A small set of images are then retrieved using a fast keyword-based search algorithm. The keyword search also uses similar keywords to those present in the graphic to get diversified examples. The retrieved set of images are reranked using contextual embeddings. Contextual embeddings are numerical vector embeddings of a given text content, such that similar pieces of text have lower distance in the contextual embedding space. The contextual embeddings are computed on the textual content of the graphic design to be revised and compared against the captions of the images accumulated post the key work search. The final set of few images are then suggested to the user. A new image is showcased at every click (e.g. a higher ranked image is shown first). The first stage of our algorithm (e.g. keyword search) ensures diversity (e.g. to ensure coverage in the images collected in the initial set, etc.) and the second part of the algorithm (e.g. with a context search) promotes specificity (e.g. to select images which best fit the current context).

Figure 4:
FIG. 4 illustrates a suggested alternative background image, according to some embodiments.

FIG. 4 illustrates set of alternative graphics 400 provided as suggested for an original graphic, according to some embodiments. The top left of FIG. 4 is the original graphic design and the other three graphics illustrate the alternate images suggested by the one click virtual button for AI assist for graphic designs.

In step 204, process 200 can cause AI assistant 104 to suggest alternate font type. For each font in a font library 1002, an expert assigns them with tags that convey their meaning and emotions. These can also be stored in font library 1002. Example tags include, inter alia: traditional, business, respect, creative, modern, strong, formal, affectionate, personal, etc.

Process 200 can use machine learning module 106 to train a content-based tag classifier. The content-base tag classifier can determine the textual content of a graphics and classify it as one of the above tags. In some embodiments, the tag classifier can use the image content. In some embodiments, the tag classifier can use both the textual and image information simultaneously. The training can be performed using a manually created expert-selected dataset 1004. Expert-selected dataset 1004 can be managed by experts that label each graphic content as one of the categories. Expert-selected dataset 1004 can be used as a ground truth for training supervised machine learning algorithms. The supervised learning algorithm can be a deep neural network, a support vector machine, a random forest algorithm and/or a naive bayes algorithm. For a given new graphic content (e.g. not part of the expert-selected dataset 1004), machine-learning module 106 can use the trained classifier to assign tags to it. The classification algorithm is a multi-label algorithm, where more than one tag can be assigned to each input content.

Once process 200 determines the output labels for a given graphic content, it can suggest fonts from the expert-selected dataset 1004 which have similar tags. An example output of the algorithm is illustrated in FIG. 5.

Figure 5:
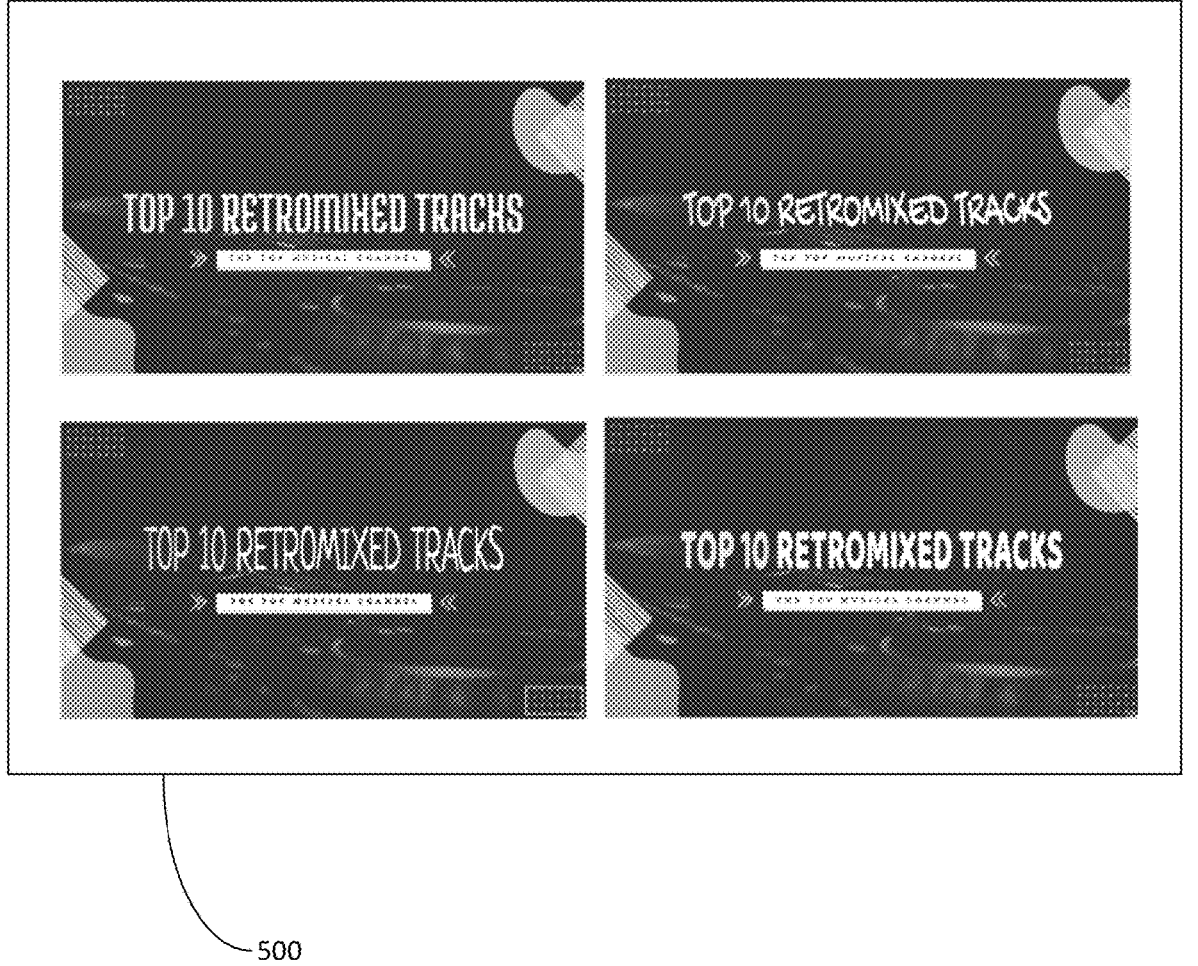
FIG. 5 illustrates an example set of images illustrating a suggested alternate font type, according to some embodiments.

FIG. 5 illustrates an example set of images 500 illustrating a suggested alternate font type, according to some embodiments. The top left is the original graphic design and the other three graphics illustrate some automatic font type suggestions.

In step 206, process 200 can cause AI assistant 104 to suggest color replacements. It is noted that colors can be also strongly associated with emotion. Step 206 can use process 1100.

FIG. 11 illustrates an example process 1100 for utilizing an AI assistant 104 to suggest color replacements in a graphic design, according to some embodiments. In step 1102, process 1100 first curates a long list of colors and color palettes (e.g. curated by a set of in-house artists, etc.). For similar to fonts, in step 1104, process 1100 also assign colors with different tags corresponding to their emotions. The tags obtained using the supervised classifier are reused in color selection as well. In step 1106, process 1100 suggests a set of colors with similar tags. In step 1108, process 1100 ranks these retrieved sets of colors based on their contrast with the background (e.g. preferring one's which at least have minimal contrast with the background) and harmony with the colors to be replaced. It is noted that the color harmony computational models are derived from perceptual/psychological experiments and represented in the form of mathematical formulas to quantify color harmony. A simple regression function can be trained/learnt/validated (e.g. by machine-learning module 106, etc.) between the user ratings on harmony and the pair of colors shown to them, to compute the harmony function.

Figure 6:
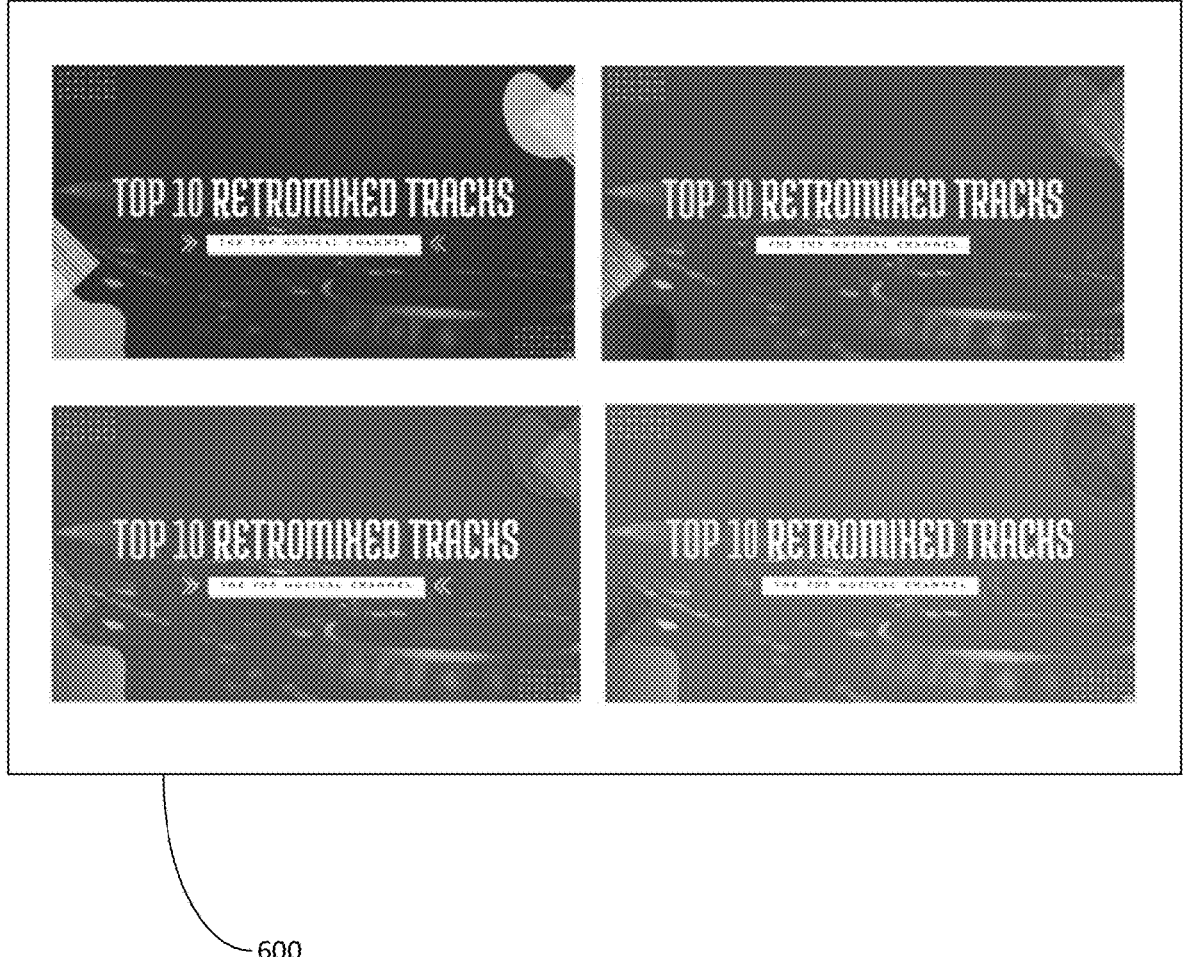
FIG. 6 illustrates an example set of automatic color suggestions, according to some embodiments.

FIG. 6 illustrates an example set of automatic color suggestions 600, according to some embodiments. The top left is the original graphic design and the other three graphics illustrate some automatic color suggestions on it.

In step 208, process 200 can cause AI assistant 104 to provide (e.g. display, etc.) an alternate layout suggestions of multiple elements in the scene. The layout suggestions algorithm 114 presents changes in the position, scale, and alignment of elements. Layout suggestion algorithm 114 employs a large database of pre-existing designs from a set of expert artists. The pre-existing designs can be obtained and stored by a pre-existing designs database 1008 managed by system 200. Each of the graphic designs in the pre-existing designs database 1008 is annotated with multiple binary variables (e.g. for, inter alia: heading, multiple headings, description paragraphs, heading subtext, clip art, use of image, use of collage, inclusion of listicle, etc.). The binary variable store response to following questions:

Does it have a Heading?

Does it have multiple headings?

Does it have a description paragraph?

Does it have subtext to the heading?

Does it use a clip art?

Does it use an image?

Does is use a collage?

Does the design contain a listicle?

Each of these responses is recorded/encoded in a binary variable. The value is 1 if the response is yes and 0 otherwise.

Given a new graphic design, Layout suggestion algorithm 114 evaluates the new graphic design against the above questions. Layout suggestion algorithm 114 can fetch matching templates from the matching templates database 1006. The content from the given design is then fit to the matching template and the responses are suggested to the user when clicking on the one click virtual button for AI assist for graphic designs.

In step 210, process 200 can cause AI assistant 104 to suggest icon replacements. In icon replacement as well, process 200 combines a keyword and contextual search (e.g. performed by keyword and/or contextual search engines in system 100, etc.). Process 200 can use keywords to first retrieve top 100 results with the similar keywords and then use a contextual search to rank them. The embeddings are computed on a sentence, if available, or computed on the set of keywords. The embeddings can be computed using BERT, Universal Sentence Encoder or any such open-source platform. A custom trained embeddings network can also be deployed. This can be developed and optimized by machine-learning module 106. The ranked results can be displayed to user at each click. A keyword algorithm can as it uses similar keywords to the given word to search the results as well. Process 200 also learn from previous user history and optimize the search results using some cues from it (e.g. using machine-learning module 106).

In step 212, process 200 can cause AI assistant 104 to suggest graphs and chart replacements. Process 200 can pre-store a graphs and chart replacements dataset 1010 of different ways to present tabular or statistical data. On pressing the one click virtual button for AI assist for graphic designs, process 200 suggests different options to the user. These suggestions are relevant to the data under exploration. It uses relevance detection algorithm 118 and then data transfer algorithm 120. Relevance detection algorithm 118 evaluates the alternate graphs and charts. Relevance detection algorithm 118 detects if they can be used with the current data displayed on the graphic. Data transfer algorithm 120 renders the new graph/chart using the same data.

In step 214, process 200 can cause AI assistant 104 to determine/support intelligent resize. FIG. 9 provides a process 900 for implementing an intelligent resize, according to some embodiments. In step 902, process 900 can determine the bounds of the whole workspace items (e.g. complete items temporary transform manager selection box's x, y, width, and height, etc.). In step 904, process 900 can match the width of the selection box to the width of the vertical project. In step 906, based on the above computation, process 900 can determine a scale factor (e.g. for converting to the designated width) and/or new centerX and centerY. In step 908, the specific scale factor is applied to all the workspace item's x, y, width, and height to make sure that it fits the workspace. In step 910, process 900 can offset the centerX and centerY. Refer to the image 700 on how the selection box fits the vertical workspace. In step 912, process 900 changes the camera item's width, height, x, and y by multiplying them with the scale factor. In step 914, process 900 resets the background to match the new workspace dimensions (e.g. to make it fit). In step 916, process 900 can remove specific scene transitions which are present in the previous dimensions but not for the current resolution (e.g. some scene transitions are created only for horizontal or vertical or square).

Figure 7:
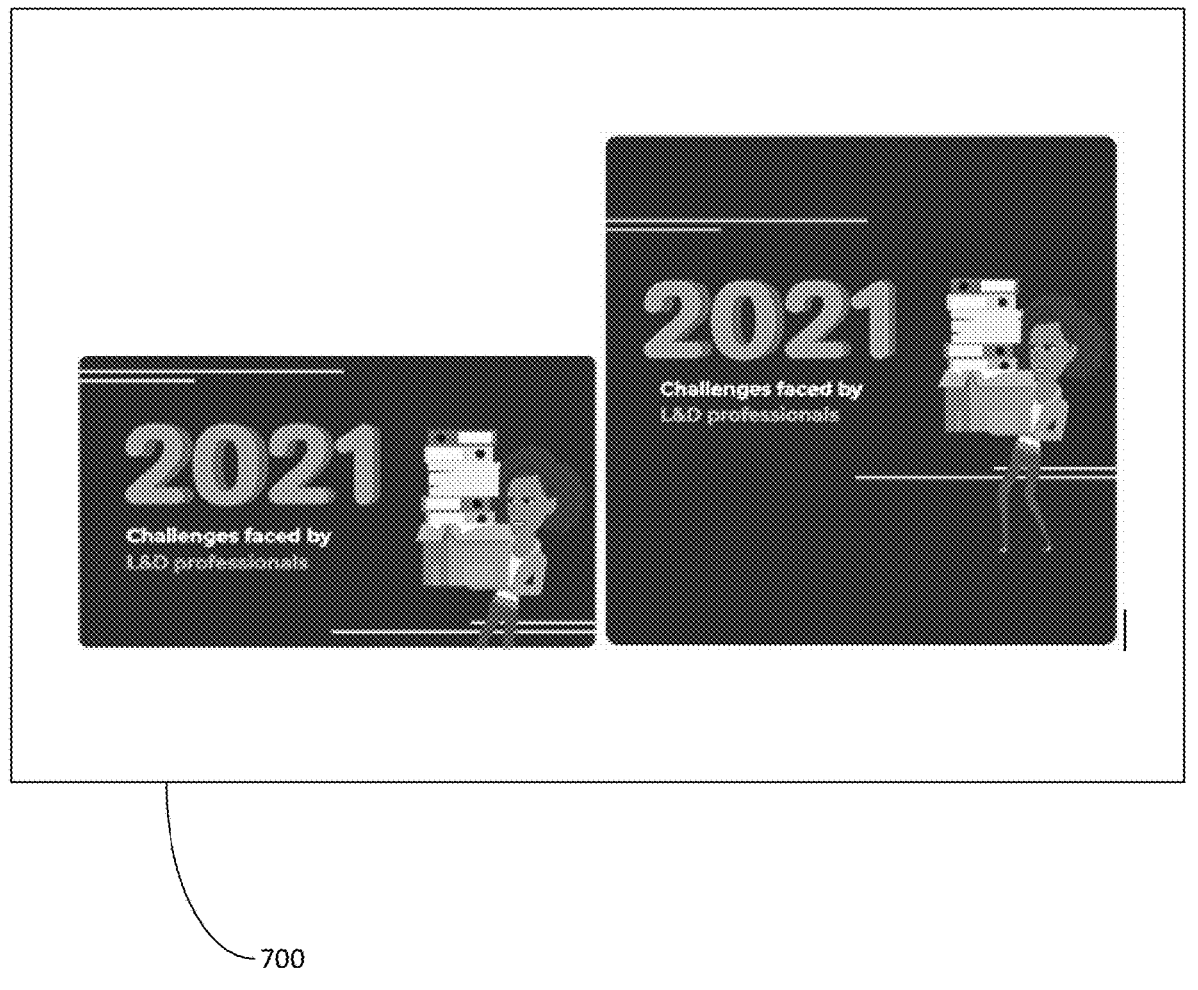
FIG. 7 illustrates an example of an intelligent resize, according to some embodiments.

FIG. 7 illustrates an example of an intelligent resize 700, according to some embodiments.

Figure 8:
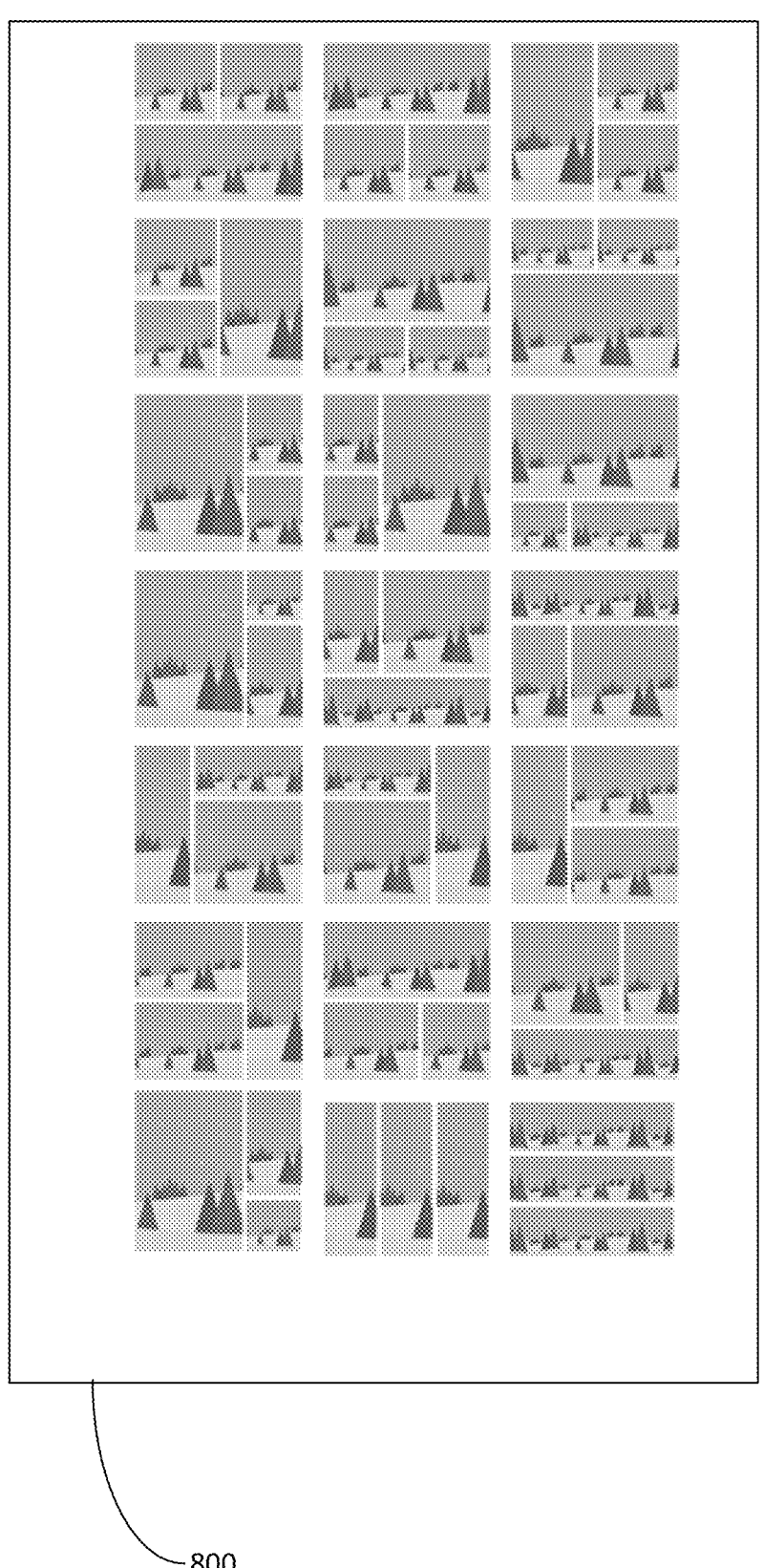
FIG. 8 illustrates an example AI-generated collage, according to some embodiments.

In step 216, process 200 can cause AI assistant 104 to suggest alternate collage configuration. Another exciting suggestion we provide is in the form of different collages. If the current content is a collage, then process 200 can suggest different possibilities for the same content. Process 200 can employ a large number of pre-designed collage configurations (e.g. stored in pre-designed collage database 1012, etc.) for the task. For example, twenty-one (21) different examples of a 3 by 3 collage are shown in FIG. 8. Process 200 picks the best collage for the given content automatically.

Process 200 can employ an image saliency detection algorithm 122 on each of the existing images in the collage. Image saliency detection algorithm 122 gives as output a saliency map(s). Image saliency detection algorithm 122 uses the saliency map to detect how important each pixel is in the image. The saliency map contains higher values for important content and lower values for unimportant content. For example, faces in image tend to get a higher saliency value. The saliency maps is computed using a deep learning algorithm. The input to the deep learning network is a digital image and output is a saliency map. Using the saliency maps, process 200 decides which is the best collage for the given graphic content and suggest the possibilities to the user. For example, for digital images where horizontal strips are most important, process 200 can suggest a three horizontal strip collage. Image saliency detection algorithm 122 picks a collage where the most salient content can be preserved. Image saliency detection algorithm 122 rank each of the collage based on how much total portion of saliency can be preserved. The suggestions are then shown to the user in the ranked order. Process 200 actions/suggestions can be displayed to the user for review and selection.

FIG. 8 illustrates an example AI-generated collage, according to some embodiments. This example includes twenty-one examples of a 3-by-3 collage.

Returning to system 100, system 100 can include Machine Learning Module 104. Machine Learning Module 104 can manage and implement the various machine learning operations discussed herein. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, which is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. Finally, the test dataset is a dataset used to provide an unbiased evaluation of a final model fit on the training dataset. If the data in the test dataset has never been used in training (e.g. in cross-validation), the test dataset is also called a holdout dataset.

System 100 can include UX Design Manager 110. UX Design Manager 110 can provide/manage a UX design. UX Design Manager 110 can promote/enable easy editing from the users end. UX can include a button to suggest changes on a particular dimension. UX Design Manager 110 also has a unified button which suggests multiple changes simultaneously. UX Design Manager 110 also present the users with a reset button to go back to the initial configuration at any given point of time. UX Design Manager 110 also allow users to re-visualize the past five suggested designs. These options enable/allow the user to choose between a free flow or a controlled exploration, as per the requirement.

Figure 3:
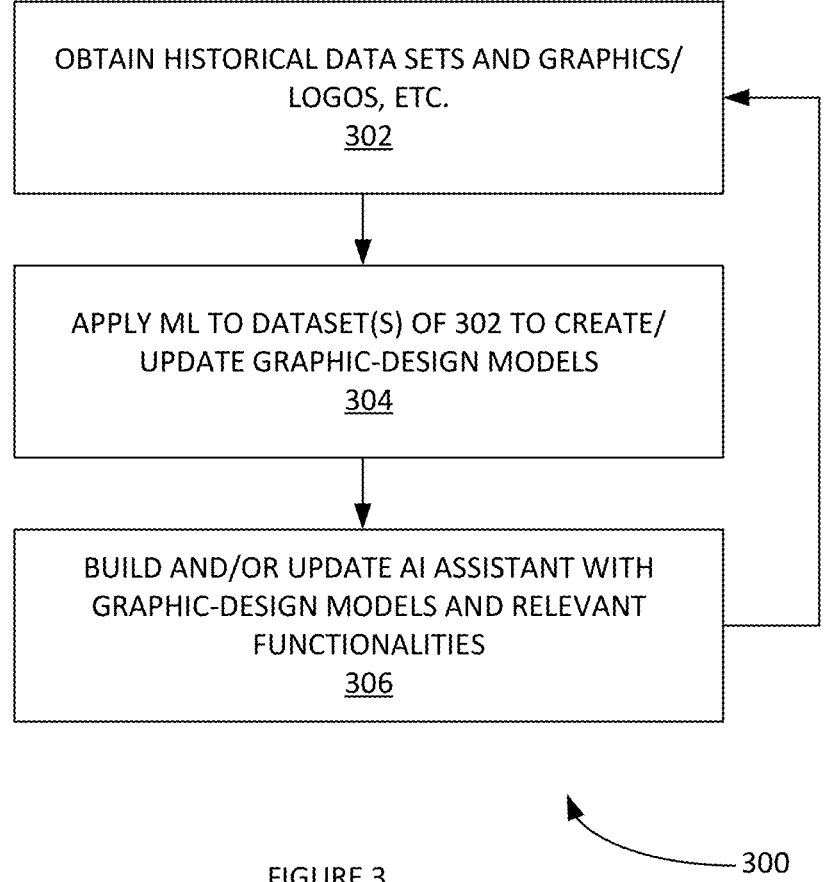
FIG. 3 illustrates a process for constructing an AI assistant, according to some embodiments.

FIG. 3 illustrates a process for constructing an AI assistant, according to some embodiments. In step 302, process 300 can obtain historical data sets and graphics/logos, etc. In step 304, process 300 can apply ML to dataset(s) of 302 to create/update graphic design models. In step 306, process 300 can build and/or update ai assistant with graphic design models and relevant functionalities.

Figure 10:
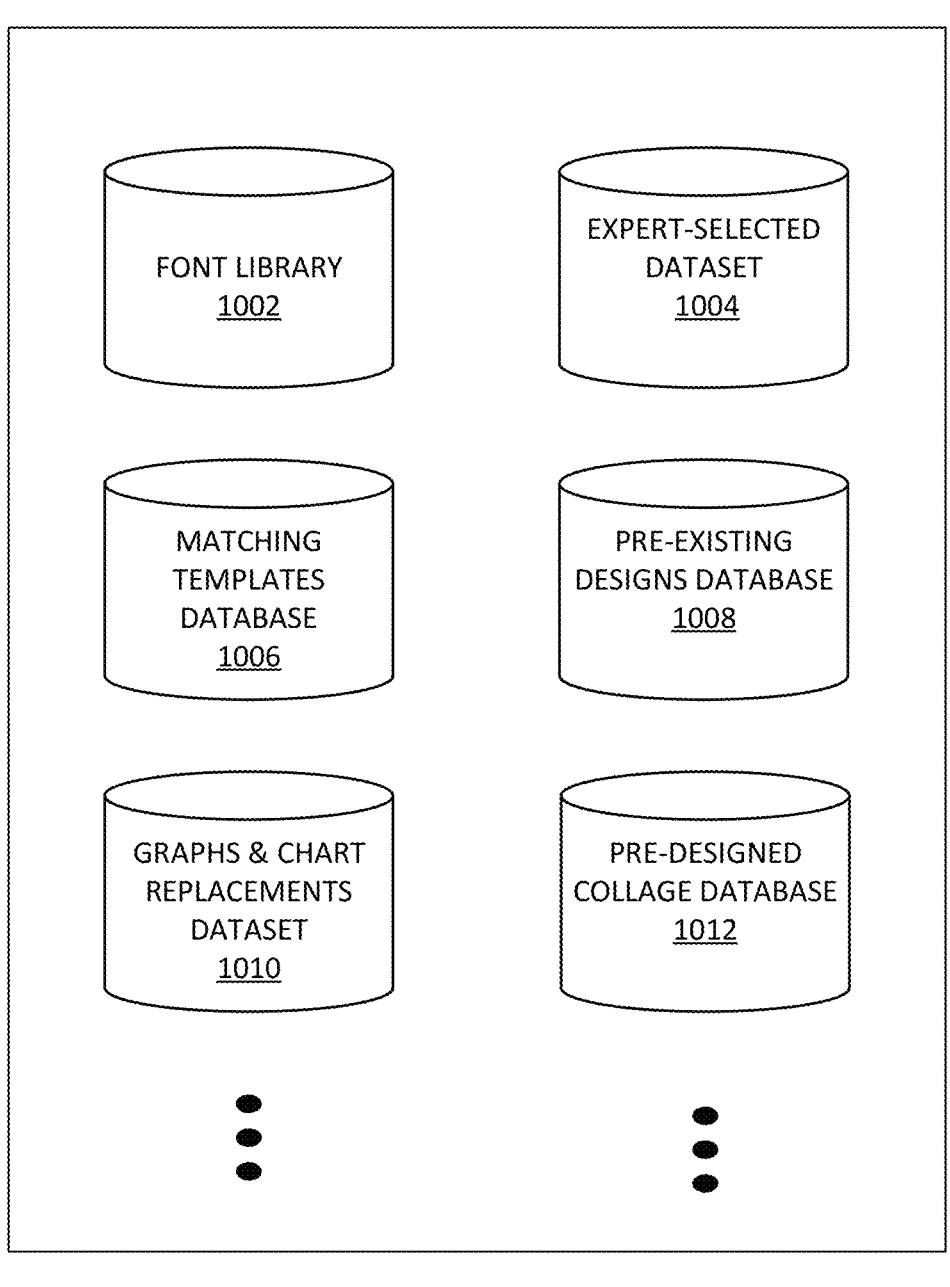
FIG. 10 illustrates an example set of datastores for implementing process 200, according to some embodiments.

FIG. 10 illustrates an example set of datastores 1002-1012 for implementing process 200, according to some embodiments. Datastores 1002-1012 are described in further detail supra. Datastores 1002-1012 can be utilized to implement a one click virtual button for AI assist for graphic designs.

Additional Systems and Architecture

Figure 12:
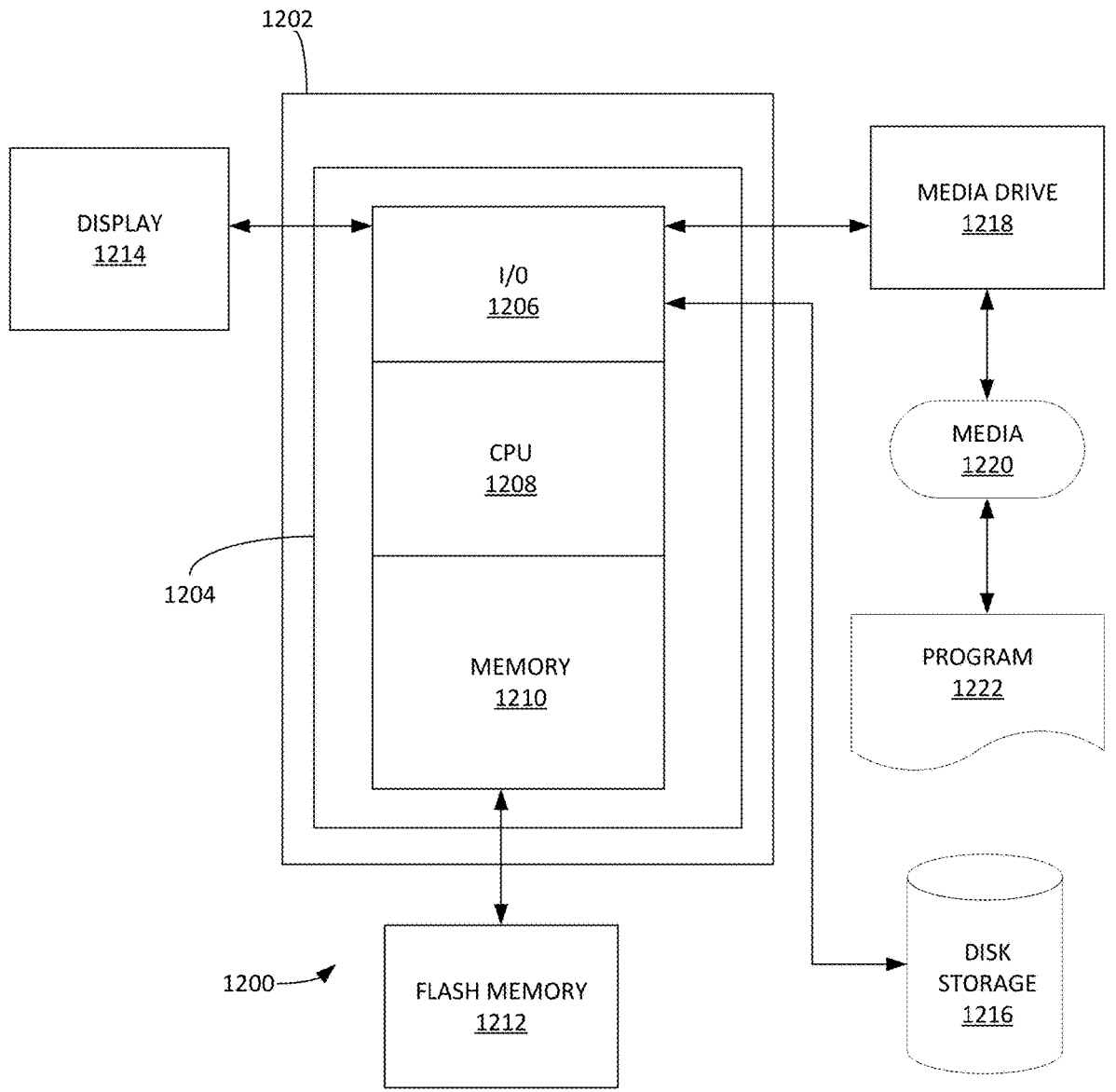
FIG. 12 depicts an exemplary computing system that can be configured to perform any one of the processes provided herein.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1206, one or more central processing units (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a computer-readable medium 1220, which can contain programs 1222 and/or data. Computing system 1200 can include a web browser. Moreover, it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method of automatically generating suggestions for a graphic design using a one click virtual button using an artificial-intelligence (AI) assistant for generating one or more contextually relevant graphic designs comprising:

receiving a digital design in a digital design tool, wherein the digital design tool comprises the one click virtual button using the AI assistant for generating the one or more contextually relevant graphic designs;

detecting an event trigger for the one click virtual button;

with the AI assistant, generating one or more automatically generating suggestions by:

determining and suggesting a set of alternate background images for the digital design, determining and suggesting a set of alternate font types, determining and suggesting a set of color replacements, determining and suggesting a set of alternate layout suggestions of multiple elements in the scene, determining and suggesting a set of icon replacements, determining and suggesting a set of graphs and chart replacements, determining and suggesting a set of resizes of the digital design, and determining and suggesting a set of alternate collage configurations;

enabling a user to select at least of the automatically generating suggestions as a user selection;

integrating the user selection into an updated version of the digital design; and displaying the updated version of the digital design in the digital design tool;

with the AI assistant, selecting the set of alternate background images from a data store of digital images, wherein the data store comprises a large resource of over one hundred million images, wherein the AI assistant utilizes an image suggestions algorithm to select the set of alternate background images;

wherein for each font in a font library, a font expert assigns each font a tag to convey a meaning and emotion of the font, wherein a supervised machine learning algorithm is used to train a content-based tag classifier, and wherein the content-base tag classifier determines the textual content of a graphics, wherein the content-based tag classifier, assigns a set of contextual tags to the existing graphic content based on the text and/or image content of the graphic, wherein the supervised machine learning algorithm comprise a deep neural network machine learning algorithm, a support vector machine learning algorithm, a random forest machine learning algorithm or a naive bayes machine learning algorithm, wherein the AI assistant uses a keyword search operation to retrieve the set of icon replacements and a contextual search operation to rank and order the set of icon replacements, wherein the digital design tool comprises a plurality of one click virtual buttons, wherein each one click virtual button of the plurality of one click virtual buttons is associated with a specified set of graphics determinations and suggestions, wherein a suggestion by the digital design tool comprises displaying the specified set of graphics determinations and suggestions, wherein the specified set of graphics determinations and suggestions comprises the set of alternate background images for the digital design set of alternate font types, the set of color replacements, the set of alternate layout suggestions of multiple elements in the scene, the set of icon replacements, the set of graphs and chart replacements, the set of resizes of the digital design, and the set of alternate collage configurations;

constructing the AI assistant by:

obtaining a historical data sets of graphics and logos;

applying a ML algorithm to historical data sets of graphics and logos to create a plurality of graphic design models; and building the AI assistant to comprise the plurality of graphic design models; and obtaining a retrieved set of images and reranked the retrieved set of images using one or more contextual embeddings, wherein the one or more contextual embeddings comprises one or more numerical vector embeddings of a text content, such that a similar piece of text has lower distance in a contextual embedding space, wherein the one or more contextual embeddings are computed on a textual content of the graphic design to be revised and compared against a plurality of captions of the images accumulated post the keyword search, and wherein a final set of few images are then suggested to the user.

2. The computerized method of claim 1, wherein the digital design tool comprises a plurality of one click virtual buttons.

3. The computerized method of claim 2, wherein each one click virtual button of the plurality of one click virtual buttons is associated with a specified graphics determination and suggestion.

4. A computerized system of automatically generating suggestions for a graphic design using a one click virtual button using an artificial-intelligence (AI) assistant for generating one or more contextually relevant graphic designs comprising:

at least one processor configured to execute instructions;

a memory containing instructions when executed on the processor, causes the at least one processor to perform operations that:

receive a digital design in a digital design tool, wherein the digital design tool comprises the one click virtual button using the AI assistant for generating the one or more contextually relevant graphic designs;

detect an event trigger for the one click virtual button;

with the AI assistant generating one or more automatically generating suggestions by:

determine and suggesting a set of alternate background images for the digital design, determine and suggesting a set of alternate font types, determine and suggesting a set of color replacements, determine and suggesting a set of alternate layout suggestions of multiple elements in the scene, determine and suggesting a set of icon replacements, determine and suggesting a set of graphs and chart replacements, determine and suggesting a set of resizes of the digital design, and determine and suggesting a set of alternate collage configuration;

enable a user to selection at least of the automatically generating suggestions as a user selection;

integrate the user selection into an updated version of the digital design; and display the updated version of the digital design in the digital design tool, and wherein the AI assistant uses a keyword search operation to retrieve the set of icon replacements and a contextual search operation to rank and order the set of icon replacements, wherein the digital design tool comprises a plurality of one click virtual buttons, wherein each one click virtual button of the plurality of one click virtual buttons is associated with a specified set of graphics determinations and suggestions, wherein a suggestion by the digital design tool comprises displaying the specified set of graphics determinations and suggestions, wherein the specified set of graphics determinations and suggestions comprises the set of alternate background images for the digital design set of alternate font types, the set of color replacements, the set of alternate layout suggestions of multiple elements in the scene, the set of icon replacements, the set of graphs and chart replacements, the set of resizes of the digital design, and the set of alternate collage configurations;

constructing the AI assistant by:

obtaining a historical data sets of graphics and logos;

applying a ML algorithm to historical data sets of graphics and logos to create a plurality of graphic design models; and building the AI assistant to comprise the plurality of graphic design models:

with the keyword search, using a plurality of similar keywords to a set of words present in the graphic to obtain a plurality of diversified examples;

obtaining a retrieved set of images and reranked the retrieved set of images using one or more contextual embeddings, wherein the one or more contextual embeddings comprises one or more numerical vector embeddings of a text content, such that a similar piece of text has lower distance in a contextual embedding space, wherein the one or more contextual embeddings are computed on a textual content of the graphic design to be revised and compared against a plurality of captions of the images accumulated post the keyword search, and wherein a final set of few images are then suggested to the user; and with the AI assistant, selecting the set of alternate background images from a data store of digital images, wherein the data store comprises a large resource of over one hundred million images, wherein the AI assistant utilizes an image suggestions algorithm to select the set of alternate background images, wherein for each font in a font library, a font expert assigns each font a tag to convey a meaning and emotion of the font, wherein a supervised machine learning algorithm is used to train a content-based tag classifier, and wherein the content-base tag classifier determines the textual content of a graphics, and wherein the supervised machine learning algorithm comprise a deep neural network machine learning algorithm, a support vector machine learning algorithm, a random forest machine learning algorithm or a naive bares machine learning algorithm.

* * * * *